US007983244B2

(12) United States Patent
Rasanen

(10) Patent No.: US 7,983,244 B2
(45) Date of Patent: Jul. 19, 2011

(54) INTERWORKING BETWEEN DOMAINS OF A COMMUNICATION NETWORK OPERATED BASED ON DIFFERENT SWITCHING PRINCIPLES

(75) Inventor: Juha A. Rasanen, Espoo (FI)

(73) Assignee: Nokia Corporation, Espoo (FI)

( * ) Notice: Subject to any disclaimer, the term of this patent is extended or adjusted under 35 U.S.C. 154(b) by 1894 days.

(21) Appl. No.: 10/915,636

(22) Filed: Aug. 11, 2004

(65) Prior Publication Data

US 2005/0141484 A1 Jun. 30, 2005

(30) Foreign Application Priority Data

Dec. 31, 2003 (EP) .................................... 03029990

(51) Int. Cl.
*H04L 12/66* (2006.01)
(52) U.S. Cl. ..................... 370/352; 370/401; 370/395.2
(58) Field of Classification Search .......... 370/352–356, 370/222–237, 395.2–395.41, 468, 464, 542, 370/543, 536, 537, 400–402, 465, 466, 252–254
See application file for complete search history.

(56) References Cited

U.S. PATENT DOCUMENTS

| 5,867,491 | A  | * | 2/1999  | Derango et al. .............. 370/329 |
| 6,404,738 | B1 | * | 6/2002  | Reininger et al. ............ 370/236 |
| 6,882,638 | B1 | * | 4/2005  | Garcia-Martin et al. ..... 370/352 |
| 7,002,993 | B1 | * | 2/2006  | Mohaban et al. ............. 370/471 |
| 7,158,508 | B2 | * | 1/2007  | Abrams et al. ................ 370/352 |
| 7,203,163 | B1 | * | 4/2007  | Hundscheidt et al. ........ 370/230 |
| 7,209,473 | B1 | * | 4/2007  | Mohaban et al. ............. 370/352 |
| 7,280,546 | B1 | * | 10/2007 | Sharma et al. ................ 370/401 |
| 2001/0034243 | A1 | * | 10/2001 | Masuda et al. ............... 455/553 |
| 2002/0120749 | A1 |   | 8/2002  | Widegren et al. |
| 2004/0002864 | A1 | * | 1/2004  | Yeom ......................... 704/270.1 |

FOREIGN PATENT DOCUMENTS

| WO | WO-00/51330 A1 | 8/2000 |
| WO | WO-01/31842 A2 | 5/2001 |

OTHER PUBLICATIONS

ITU-T Recommendation H.221, Series H: Audiovisual and Multimedia Systems, Infrastructure of Audiovisual Services—Transmission Multiplexing and Synchronization, Frame structure for a 64 to 1920 kbit/s channel in audiovisual teleservices (Mar. 2004).
ITU-T Recommendation H.223, Series H: Audiovisual and Multimedia Systems, Infrastructure of Audiovisual Services—Transmission Multiplexing and Synchronization, Multiplexing protocol for low bit rate multimedia communication (Jul. 2001).

(Continued)

*Primary Examiner* — Simon Sing
*Assistant Examiner* — Akelaw A Teshale
(74) *Attorney, Agent, or Firm* — Mintz, Levin, Cohn, Ferris, Glovsky and Popeo, P.C.

(57) ABSTRACT

Multimedia calls addressed an increased data rate are disclosed. The multimedia calls use the multicall supplementary service in circuit switched mobile networks and a multilink operation to separate calls for each portion of the total session. The calling entity establishes several calls to the same party. The sending entity splits the data into the separate simultaneous channels/calls. The receiving entity combines the data received from the separate simultaneous calls (multicall, multilink). IP-based multimedia uses one session for each media component. The IP/CS interworking is arranged, if the CS leg uses a multicall/multilink operation.

5 Claims, 7 Drawing Sheets

OTHER PUBLICATIONS

ITU-T Recommendation H.225, Series H: Audiovisual and Multimedia Systems, Infrastructure of Audiovisual Services—Transmission Multiplexing and Synchronization, Call signaling protocols and media stream packetization for packet-based multimedia communication systems (Jul. 2003).

ITU-T Recommendation H.242, Series H: Audiovisual and Multimedia Systems, Infrastructure of Audiovisual Services—Communication Procedures, System for establishing communication between audiovisual terminals using digital channels up to 2 Mbit/s (Mar. 2004).

ITU-T Recommendation H.245, Series H: Audiovisual and Multimedia Systems, Infrastructure of Audiovisual Services—Communication Procedures, Control protocol for multimedia communication (Feb. 2003).

ITU-T Recommendation H.320, Series H: Audiovisual and Multimedia Systems, Infrastructure of Audiovisual Services—Systems and Terminal Equipment for Audiovisual Services, Narrow-band visual telephone systems and terminal equipment (Mar. 2004).

ITU-T Recommendation H.323, Series H: Audiovisual and Multimedia Systems, Infrastructure of Audiovisual Services—Systems and Terminal Equipment for Audiovisual Services, Packet-based multimedia communications system (Jun. 2003).

ITU-T Recommendation H.320, Series H: Audiovisual and Multimedia Systems, Infrastructure of Audiovisual Services—Systems and Terminal Equipment for Audiovisual Services, Terminal for low bit-rate multimedia communication (Mar. 2002).

ITU-T Recommendation Q.931, Series Q: Digital Subscriber Signalling System No. 1—Network Layer ISDN user-network interface layer 3 specification for basic call control (May 1998).

Network Working Group Request for Comments: 2327 Category: Standards Track, SDP: Sessions Description Protocol, M. Handley et al., Apr. 1998.

Network Working Group Request for Comments: 3261 Obsoletes: 2543, Category: Standards Track, SIP: Session Initiation Protocol, J. Rosenberg et al., Jun. 2002.

Network Working Group Request for Comments: 3388, Category: Standards Track, Grouping of Media Lines in the Session Description Protocol (SDP), G. Camarillo et al., Dec. 2002.

3GPP TS 29.007 v5.8.0 (Dec. 2003) (Release 5).

3GPP TS 26.236 v5.2.0 (Mar. 2003) (Release 5).

3GPP TS 24.229 v5.6.0 (Sep. 2003) (Release 5).

Verbeke, et al., "Architectures for Internet Traffic Off-Load From the PSTN/ISDN Network", 38th European Telecommunications Congress, Proceedings Networking the Future, Aug. 24, 1999, pp. 172-175.

* cited by examiner

INTERWORKING BETWEEN DOMAINS OF A COMMUNICATION NETWORK OPERATED BASED ON DIFFERENT SWITCHING PRINCIPLES

FIELD OF THE INVENTION

The present invention relates to a method for enabling interworking between domains of a communication network operated based on different switching principles, such as circuit switched and packet switched communications, as well as to a correspondingly adapted interworking entity.

BACKGROUND OF THE INVENTION

Recently, communication technology has made considerable progress and there is a continuing trend to apply not only circuit switched communications but also packet switched communications. Also, terminals configured to operate according to one of those switching principles may get involved in a communication involving a terminal configured to operate according to another of those switching principles. In such cases, in order to maintain interoperability and compatibility, an interworking functionality has to be provided for.

Although the present invention is described subsequently with reference to circuit switched and packet switched communication, it is to be noted that these serve as examples only. Other switching principles may likewise be concerned by the present invention.

Still further, in order to describe specific embodiments of the present invention, reference is made to particular protocols currently already in use or under development. Any such reference to specific protocols and messages complying with such protocols are to be understood as an example only, and the present invention is not limited to those specific protocols/messages. Rather, any functionally similar protocol/message may be used in connection with the present invention.

Communication networks are generally divided in so-called domains. For the purpose of the present invention, a domain is distinguished from another domain based on the switching principle used in a respective domain, such as circuit switched or packet switched.

A transmission of data between a first and a second terminal is referred to as a session. A session comprises at least one transmission context, e.g. a PDP context (Packet Data Protocol) in case of a packet switched transmission or a similar context in case of a circuit switched transmission. Within a respective context, plural calls and/or channels may be present, e.g. plural packet flows in case of packet switched transmission or plural circuit switched calls in case of circuit switched transmission.

A particular focus in recent developments of communication networks (fixed networks such as the Internet as well as mobile networks such as a 3GPP network) is being laid on multimedia services. A multimedia service subscription enables a terminal to transmit data of different media types such as voice, video, or still image, sound, data "as such", etc. Multimedia services often require real-time transmission in order to satisfy the needs of the end-users.

Both, i.e. circuit switched (CS) and packet switched IP (Internet Protocol) based (IMS) multimedia services are available in 3GPP networks ($3^{rd}$ generation Partnership Projects).

Several solutions have been specified for real-time circuit switched and packet switched video/multimedia communication such as telephony in fixed networks, as briefly outlined below.

Fixed Networks:
IP Based Fixed Networks:

Several approaches are available for a real-time multimedia transmission over IP networks, of which two approaches are briefly introduced below.

ITU-T has specified "Packet-based multimedia communications systems" in a recommendation.

In this case, the session is set up through the exchange of call control signaling messages over a TCP/IP (Transmission Control Protocol/Internet Protocol) connection, and the negotiation of capabilities is based on the use of the inband protocol control channel. The call control signaling is used for establishing a connection between two packet switched multimedia terminals. The inband protocol control signaling is used for capabilities exchange (i.e. codec negotiation), flow control, etc. between the terminals.

IETF (Internet Engineering task Force) has specified "Session Initiation Protocol (SIP)" which is an application-layer control/signaling protocol for creating, modifying and terminating (e.g.) multimedia sessions with one or more participants.

In the SIP/IETF case, the session is set up through the exchange of SIP messages, and the negotiation of capabilities is based on the exchange of session description protocol (SDP) elements over the SIP signaling.

A protocol stack on the user plane in the IP based multimedia communication is IP/UDP/RTP. Media streams (audio, video, data) are not multiplexed as in circuit switched CS multimedia, but are transported independently of each other over separate RTP sessions.

Circuit Switched Fixed Networks:

Several protocols have been developed by ITU-T for circuit switched (CS) video/multimedia services in PSTN (Public Switched Telecommunication Network) and ISDN (Integrated Services Digital Network).

The current situation is as follows:

CS video/multimedia solution: The basic CS video/multimedia solution is meant for a V.34 modem based video/multimedia communication over PSTN. The multiplexing of the media components is based on the framing protocol specified by ITU-T in a recommendation. The ITU inband protocol is used as the control protocol for the exchange of capabilities, e.g. for a codec negotiation.

extended CS video/multimedia solution: The extended CS video/multimedia solution is an extension to the basic CS video/multimedia solution and defines measures, such as the mandatory use of a retransmission protocol in the control channel and several robustness levels of the multiplexer, to be used in error-prone environments (like mobile networks). The measures are described in certain annexes of respective recommendations.

Another CS video/multimedia solution: Another CS video/multimedia solution is meant for video/multimedia communication over ISDN at data rates from 56 kbit/s to 1920 kbit/s. CS video/multimedia solution terminals use a specific user-network interface instead of the V.34 modem. Multiplexing, control channel and data transmission are as in the basic CS video/multimedia solution (see above). CS video/multimedia solution terminals support an inband negotiation mechanism to determine network end-to-end connectivity and to automatically negotiate a selected mode for the call among the CS video/multimedia solution modes, and voice telephone modes.

Still another CS video/multimedia solution: Still another CS video/multimedia solution is meant for video/multimedia communication over ISDN at data rates from 56 kbit/s to 1920 kbit/s. CS video/multimedia solution terminals use a specific user-network interface. The multiplexing of the media components is based on the framing protocol according to ITU-T recommendation. The inband protocol is used as the control protocol for the exchange of capabilities, e.g. for a codec negotiation.

The solutions support, either as mandatory or optional, at least some same codecs for audio and video. In some cases, i.e. when a given implementation does not support the optional codecs, transcoding is required.

Mobile Networks:
Conversational IP Based Mobile Networks:

3GPP specification release 5 (Rel-5) defines IP based multimedia services (IMS) that support real-time conversational multimedia over IP networks and a real-time packet switched streaming service (PSS) over IP networks.

The control plane of the conversational multimedia is based on 3GPP SIP, which is a 3GPP variant of the IETF SIP protocol. The session is set up through the exchange of SIP messages, and the negotiation of capabilities is based on the exchange of SDP elements over the SIP signaling. The protocol stack on the user plane is IP/UDP/RTP.

Streaming IP Based Mobile Networks:

3GPP specifications support both continuous streaming multimedia (media with an inherent notion of time, i.e. speech, audio, video, timed text) and discrete streaming multimedia (media that itself does not contain an element of time). For continuous media the protocol stack on the user plane is IP/UDP/RTP and the session control is based on RTSP and SDP. For discrete media the protocol stack on the user plane is IP/TCP/HTTP and the control is based on SMIL or SDP over HTTP, i.e. there is no separate session control protocol.

Circuit Switched Mobile Networks:

Circuit switched (CS) multimedia services in 3GPP networks, also known as CS video/multimedia solution, are based on the corresponding ITU-T recommendation, including an annex that defines the use of CS video/multimedia solution terminals in error-prone transmission environments like mobile networks. The transparent bearer service BS30, with a parameter indicating that the application is video/multimedia, is used in the mobile network. The multiplexing of the media components, based on the framing protocol ITU-T recommendation, is realized at the terminals. The inband protocol is used as the control protocol for the exchange of capabilities, e.g. for a codec negotiation. Additionally, higher end-to-end data rates can be achieved in 3G networks with the use of the multicall supplementary service.

Multicall in Mobile Networks:

The 3GPP Multicall supplementary service can be used for increasing the end-to-end data rate in multimedia calls in 3G networks (UTRAN). The core network handles the calls as independent calls. Both the network and the terminals (user equipments, UEs) need to support the Multicall supplementary service. The multiplexing of the multimedia signal to/from the connections is performed on the application level by the terminals. The Multicall supplementary service supports 2-6 simultaneous data calls for a terminal UE, e.g. 2 times 64 kbit/s=128 kbit/s, 6 times 64 kbit/s=384 kbit/s.

In case terminals operated according to such different switching principles are involved in a communication with each other, a certain interworking is required. In particular in connection with multimedia communications involving rather high transmission data rates, interworking may become complex.

Up to now, interworking between IP/CS multimedia communication has not been standardized in that there are no 3GPP standards, no IETF standards, and also no ITU-T standards.

In connection with video call conferencing, where a media gateway (MGW) and/or a conference unit (MCU, multipoint control unit) receives calls from several users participating in a conference call, each leg (some of which may be IP based and some ISDN multilink based) is terminated at the MGW/MCU and the transmission framing protocols and media coding (i.e. transcoding of media streams) is mapped. Further information may be found e.g. in corresponding ITU-T recommendations.

However, there is no end-to-end interworking at the session establishment.

Furthermore, video gateway solutions are currently offered by some manufacturers. Those solutions aim to support packet switched/circuit switched multimedia interworking. However, the documentation seen by the present inventor so far discusses only the mapping of basic protocols (packet switched multimedia, CS video/multimedia solution, transmission and codecs (i.e. transcoding). There are no hints of supporting interworking between domains of a communication network operated based on different switching principles.

In connection with multimedia calls, high data rates are not unusual. A high data rate means for example a data rate higher than 64 kbit/s. A video/multimedia call at such a high data rate, i.e. higher than 64 kbit/s (e.g. 128 kbit/s) uses—in a circuit switched domain or environment—the multicall supplementary service in circuit switched 3GPP mobile networks and a multilink operation in ISDN.

In both networks the "multi-operation" actually means separate calls for each max. 64 kbit/s portion of the total session, i.e. the calling entity establishes several calls to the same (called) B party. The sending entity (at each end) splits the data into the separate simultaneous channels/calls whereas the receiving entity combines the data received from the separate simultaneous calls (multicall, multilink).

Packet switched such as IP based multimedia transmissions typically uses one RTP session for each media component, i.e. one RTP session for audio, one for video, one for data, etc., no matter what the bandwidth requirement for each media component is.

Therefore, it is a problem how the interworking between domains of a communication network operated based on different switching principles such as CS/IP can be arranged, if the CS leg uses a multicall/multilink operation.

SUMMARY OF THE INVENTION

Hence, it is an object of the present invention to provide a solution to the above identified problem.

According to the present invention, this object is—according to one aspect—for example achieved by a method for enabling interworking between domains of a communication network operated based on different switching principles, wherein a communication session between a first terminal associated to a first domain and a second terminal associated to a second domain is effected via a first communication path leg from said first terminal to a gateway entity, and from said gateway entity via a second communication path leg to said second terminal, wherein said second communication path leg has a restricted transmission bandwidth per call of said communication session, the method comprising the steps of: originating said communication session from said first terminal via said first leg towards said gateway entity, determining, at said gateway entity, whether said second terminal is capable of supporting a number of calls required for handling the originated session, and in case said second terminal is incapable of supporting such a number, adapting the communication session on said first communication path leg to the capabilities of said second terminal.

According to an advantageous further development said communication session is a multimedia session, and said step of adapting comprises a step of selecting a media component of said communication session, and renegotiating the bandwidth of said selected media component to a lower bandwidth.

According to the present invention, this object is—according to another aspect—for example achieved by a method for enabling interworking between domains of a communication network operated based on different switching principles, wherein a communication session between a first terminal associated to a first domain and a second terminal associated to a second domain is effected via a second communication path leg from said second terminal to a gateway entity, and from said gateway entity via a first communication path leg to said first terminal, wherein said first communication path leg has a restricted transmission bandwidth for a communication session, the method comprising the steps of: originating said communication session from said second terminal via said second leg towards said gateway entity using a plurality of calls for said communication session, determining, at said gateway entity, whether said first terminal is capable of supporting the plurality of calls constituting the originated session, and in case said first terminal is incapable of supporting such a plurality, adapting the communication session on said second communication path leg to the capabilities of said first terminal.

According to an advantageous further development said communication session is a multimedia session, and said step of adapting comprises a step of selecting a call of said communication session, and inhibiting the selected call on said second communication path leg.

According to the present invention, this object is—according to still another aspect—for example achieved by a method for enabling interworking between domains of a communication network operated based on different switching principles, wherein a communication session between a first terminal associated to a first domain and a second terminal associated to a second domain is effected via a first communication path leg from said first terminal to a gateway entity, and from said gateway entity via a second communication path leg to said second terminal, wherein said second communication path leg has a restricted transmission bandwidth per call of said communication session, the method comprising the steps of: evaluating whether said communication session to be originated requires a transmission bandwidth exceeding said restricted transmission bandwidth per call of said communication session on said second communication path leg, and if said required transmission bandwidth exceeds said restricted transmission bandwidth per call, splitting said communication session to be originated into a plurality of sub-sessions not exceeding said restricted transmission bandwidth, originating the plurality of said sub-session from said first terminal via said first leg towards said gateway entity, and mapping said plurality of sub-sessions to a plurality of calls on said second communication path leg.

According to an advantageous further development the method further comprises the steps of determining, at said gateway entity, whether said second terminal is capable of supporting a plurality of calls corresponding to the number of originated sub-sessions, and in case said second terminal is incapable of supporting such a plurality of calls, adapting the communication session on said first communication path leg to the capabilities of said second terminal;

said step of adapting comprises a step of selecting a sub-session of said communication session, and inhibiting the selected sub-session on said first communication path leg;

said step of splitting further comprises a step of maintaining a binding for said sub-sessions indicating that said split sub-sessions constitute said communication session;

said step of evaluating further comprises the steps of judging a response received at said first terminal from said gateway in reaction to a session establishment request.

According to the present invention, this object is—according to still a further another aspect—for example achieved by a method for enabling interworking between domains of a communication network operated based on different switching principles, wherein a communication session between a first terminal associated to a first domain and a second terminal associated to a second domain is effected via a second communication path leg from said second terminal to a gateway entity, and from said gateway entity via a first communication path leg to said first terminal, the method comprising the steps of: originating said communication session from said second terminal via said second leg towards said gateway entity using a plurality of calls for said communication session, maintaining, at said gateway entity, a binding for said plurality of calls indicating that said plurality of calls constitute said communication session; and establish said plurality of calls to a plurality of sessions on said first communication path leg.

Notwithstanding the above focus on a method aspect of the present invention, it is to be understood that the present invention also concerns a gateway entity configured to enable interworking between domains of a communication network operated based on different switching principles, and operating according to the methods as described herein.

In particular, this involves a gateway entity to enable interworking between domains of a communication network operated based on different switching principles, the gateway entity comprising:

receiving means for receiving a communication session originated from a first terminal via a first communication path leg towards the gateway entity;

determining means for determining, at said gateway entity, whether a second terminal is capable of supporting a number of calls required for handling the received originated communication session; and adapting means for adapting the communication session on the first communication path leg to capabilities of said second terminal if said second terminal is incapable of supporting the number of calls.

Furthermore, this involves:

a gateway entity to enable interworking between domains of a communication network operated based on different switching principles, the gateway entity comprising:

receiving means for receiving a communication session originated from a second terminal via a second communication path leg towards a gateway entity using a plurality of calls for said communication session;

determining means for determining, at said gateway entity, whether a first terminal is capable of supporting the plurality of calls constituting the received originated communication session; and adapting means for adapting the communication session on the second communication path leg to capabilities of said first terminal if said first terminal is incapable of supporting the plurality of calls.

In addition, this involves a gateway entity to enable interworking between domains of a communication network operated based on different switching principles, the gateway entity comprising:

receiving means for receiving a plurality of said sub-sessions originated from a first terminal via a first communication path leg towards the gateway entity; and mapping means for mapping said plurality of sub-sessions to a plurality of calls on said second communication path leg.

And, this involves:

a gateway entity to enable interworking between domains of a communication network operated based on different switching principles, the gateway entity comprising:

receiving means for receiving a communication session originated from a second terminal via a second communication path leg towards the gateway entity using a plurality of calls for said communication session;

maintaining means for maintaining, at said gateway entity, a binding for said plurality of calls indicating that said plurality of calls constitute said communication session; and establishing means for establishing said plurality of calls to a plurality of sessions on said first communication path leg.

Accordingly, as derivable from the above, stated in other words the proposed solution according to the present invention is two-fold, either 1) the gateway entity such as a MGCF+MGW (Media Gateway Control Function+Media Gateway) performs aggregation and separation of a multicall, or 2) several media streams/SIP calls (generally denoted as sessions) should be used.

Thus, the present invention, in various scenarios for uplink or downlink transmission, enables interworking with the multicall/multilink between communication network domains operated based on different switching principles such as IMS and CS network domains at data rates higher than 64 kbit/s. Further, IMS (or IP) interworking with 3G-324M multicall and ISDN multilink operation is possible, thereby enabling multimedia calls between IMS (or IP) and CS networks at data rates higher than 64 kbit/s.

DETAILED DESCRIPTION OF PREFERRED EMBODIMENTS

The present invention will be described with reference to the drawings in greater detail.

Figure 5:
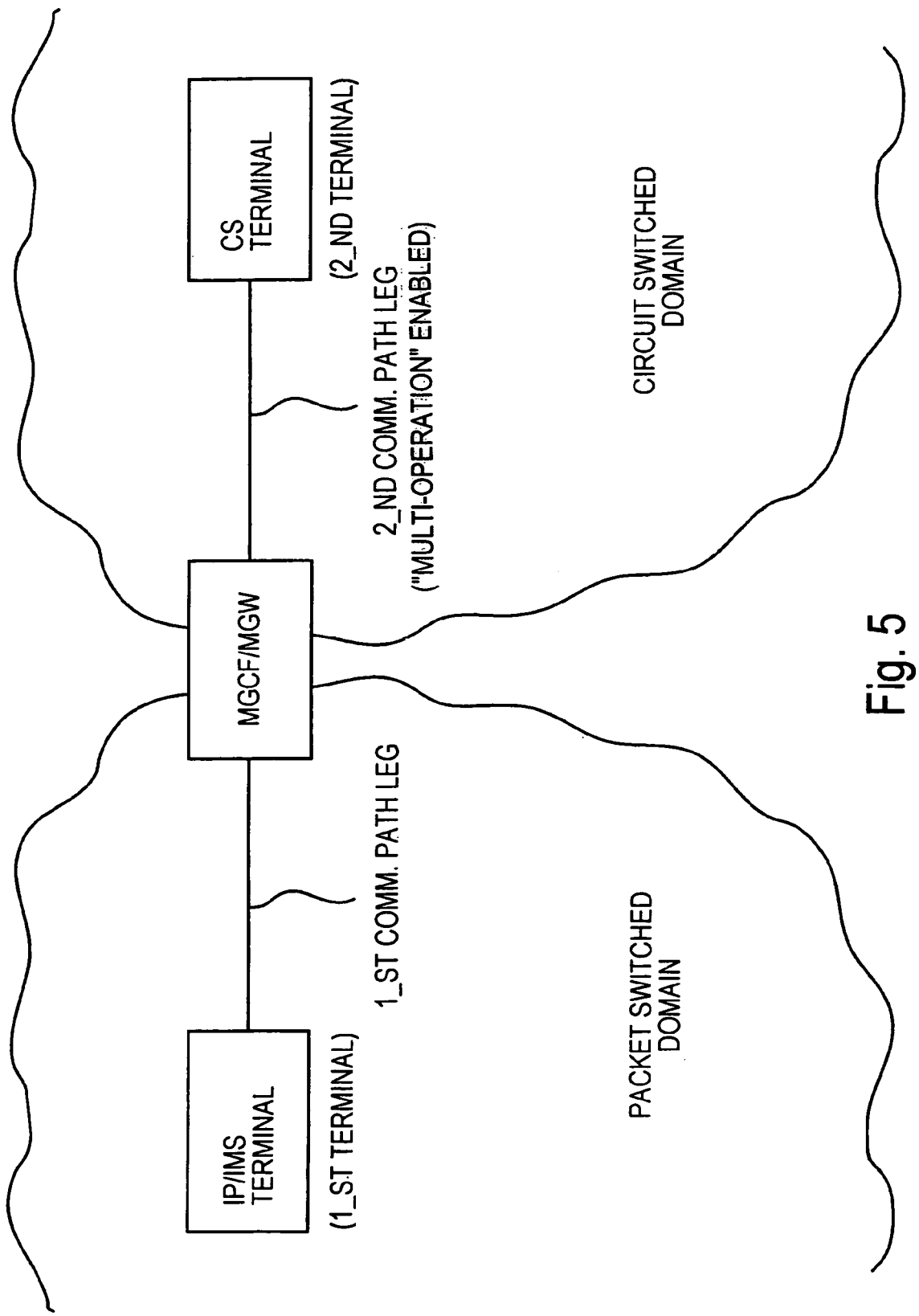
FIG. 5 is a rough block diagram of a communication network comprising different domains operated based on different switching principles.

FIG. 5 shows two terminals that may be involved in a communication session via a communication network. A first terminal such as e.g. an IP/IMS terminal, is operated based on a packet switched principle and is associated to a first domain of the network, i.e. the packet switched domain. A second terminal such as e.g. a CS terminal, is operated based on a circuit switched principle and is associated to a second domain of the network, i.e. the circuit switched domain. At the boundary between these domains of the communication network operated based on different switching principles there is located a so-called gateway entity which is illustrated as a MGCF/MGW.

In a communication session between the first terminal associated to a first domain and the second terminal associated to a second domain, communication is effected via a first communication path leg from said first terminal to the gateway entity, and from said gateway entity via a second communication path leg to said second terminal.

The second communication path leg has a restricted transmission bandwidth per call of said communication session, while in the CS domain, a multi-operation feature is available. Thus, the bandwidth on the second leg which is available for communication to/from the second terminal can reach an integer multiple of the bandwidth per call.

First Embodiment

The first embodiment of the present invention is also referred to as solution 1 in the following description.

Basically, when described on a general level, according to the first embodiment, the present invention proposes a method for enabling interworking between domains of a communication network operated based on different switching principles. A communication session between a first terminal associated to a first domain and a second terminal associated to a second domain is effected via a first communication path leg from said first terminal to a gateway entity, and from said gateway entity via a second communication path leg to said second terminal. Said second communication path leg has a restricted transmission bandwidth per call of said communication session.

Figure 1:
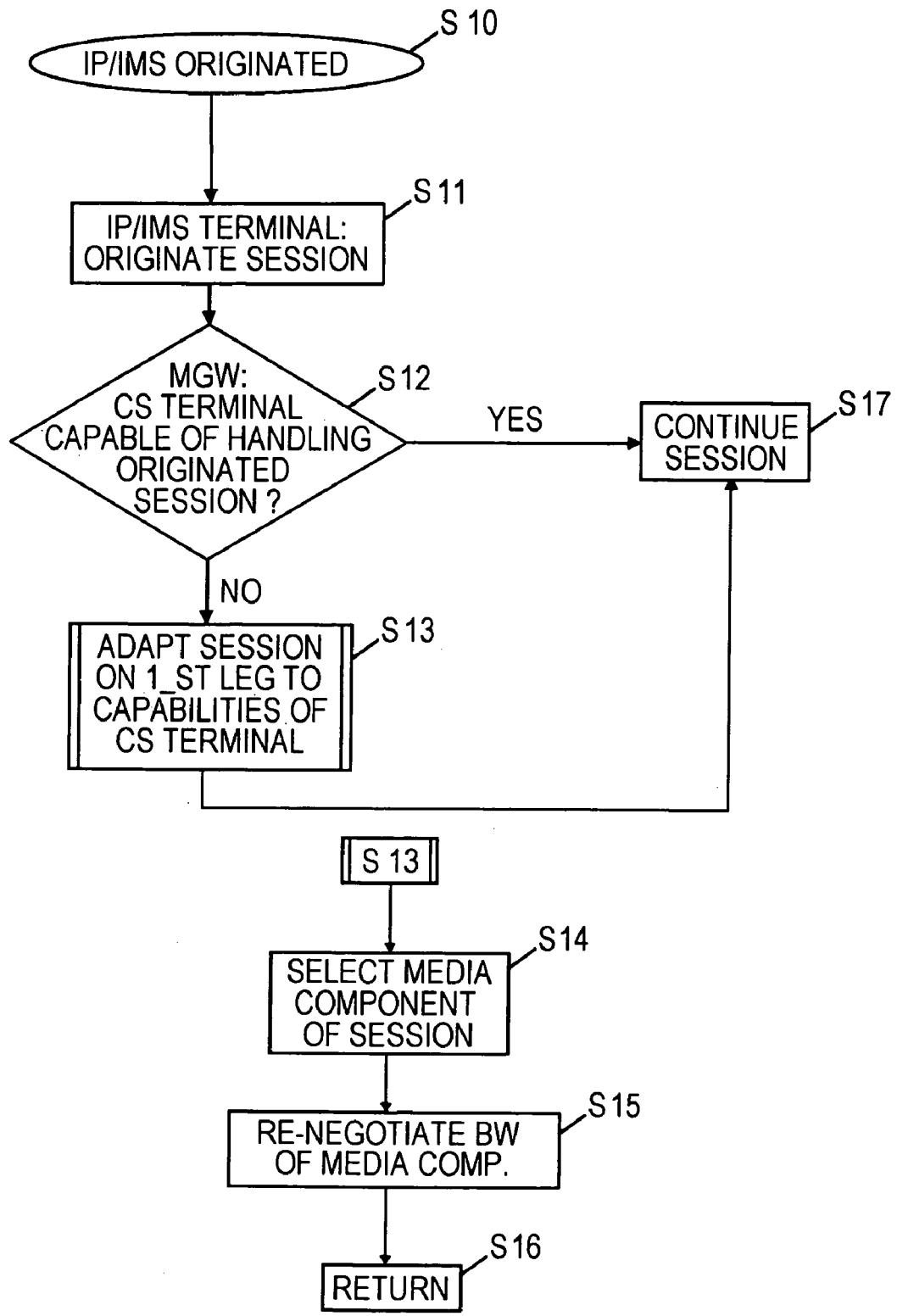
FIG. 1 is a flowchart illustrating the method according to a first embodiment of the present invention in case of a packet switched domain originated session.

As shown in FIG. 1, the method comprises the steps of:

originating, S11, said communication session from said first terminal via said first leg towards said gateway entity, determining, S12, at said gateway entity, whether said second terminal is capable of supporting a number of calls required for handling the originated session, and in case said second terminal is incapable of supporting such a number, adapting, S13, the communication session on said first communication path leg to the capabilities of said second terminal.

After adaptation and in case said second terminal has the required capabilities, the session continues normally, S17.

With reference to an example in which said communication session is a multimedia session, said step of adapting comprises a step of selecting, S14, a media component of said communication session, and renegotiating, S15, the bandwidth of said selected media component to a lower bandwidth. After these steps, the flow returns, S16, to the main routine and the session continues normally.

FIG. 1 illustrates the case in which the establishment of the communication session is originated from the first terminal and terminated at the second terminal.

Figure 2:
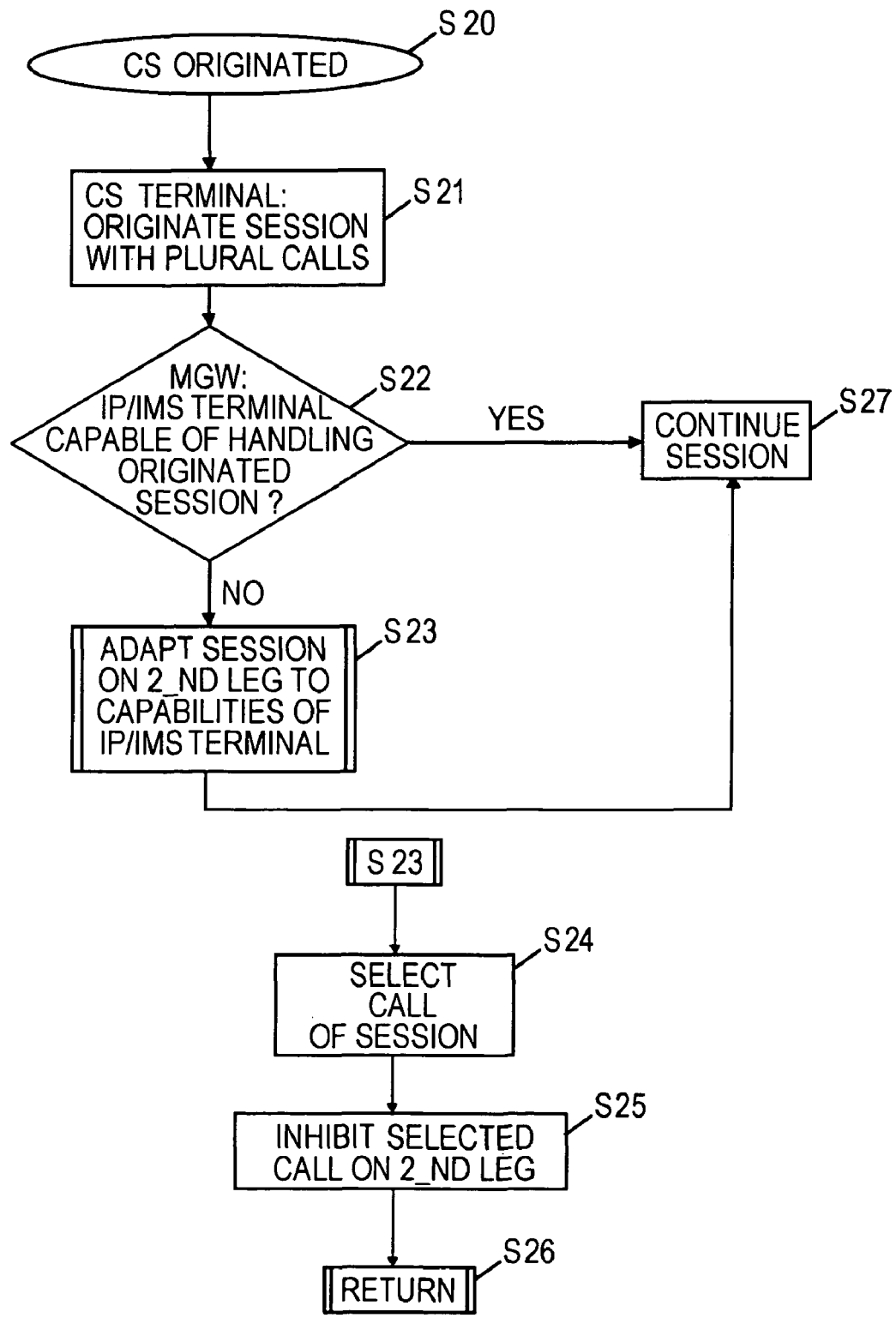
FIG. 2 is a flowchart illustrating the method according to the first embodiment of the present invention in case of a circuit switched domain originated session.

FIG. 2 illustrates the case in which the establishment of the communication session is terminated at the first terminal, i.e. originated from the second terminal.

Basically, when described on a general level, according to the first embodiment, the present invention proposes under such a scenario a method for enabling interworking between domains of a communication network operated based on different switching principles. A communication session between a first terminal associated to a first domain and a second terminal associated to a second domain is effected via a second communication path leg from said second terminal to a gateway entity, and from said gateway entity via a first communication path leg to said first terminal. Said first communication path leg has a restricted transmission bandwidth for a communication session.

As shown in FIG. 2, the method comprises the steps of:
originating, S21, said communication session from said second terminal via said second leg towards said gateway entity using a plurality of calls for said communication session,
determining, S22, at said gateway entity, whether said first terminal is capable of supporting the plurality of calls constituting the originated session, and in case said first terminal is incapable of supporting such a plurality,
adapting, S23, the communication session on said second communication path leg to the capabilities of said first terminal.

After adaptation and in case said first terminal has the required capabilities, the session continues normally, S27.

With reference to an example in which said communication session is a multimedia session, said step of adapting comprises a step of selecting, S24, a call of said communication session, and inhibiting, S25, the selected call on said second communication path leg. After these steps, the flow returns, S26, to the main routine and the session continues normally. Inhibiting means to terminate an ongoing call or to reject a newly requested call.

Having described the present invention on a general level hereinbefore, the present invention is subsequently described with reference to a practical example. The respective correspondence between the general features of the invention and the practical implementation of these features in the practical example will be readily recognized by the interested reader.
Solution 1: IP and CS Multicall/Multilink Interworking:

The IMS/CS Multicall interworking is supported by the network with some decision making and session/call manipulation measures in the MGCF/MGW or in a video gateway network element, or any other suitable configured entity.

The procedure in an IP/IMS originated session is as follows:
The IP/IMS terminal initiates a session such as a SIP session by sending an INVITE (=offer) which is directed to the MGCF if the called party is in a CS network.
The MGCF responds (=answer) to the INVITE and deduces from the parameters of the offer/answer negotiation (typically from the bandwidth parameters of the media streams) whether the requested session can be supported with a single (64 kbit/s) call in the CS network.
If not, the MGCF deduces the number of simultaneous CS calls required to support the multimedia session.
The MGCF sets up the CS calls. Depending on the level of support of the multicall feature by the CS party, i.e. supporting fewer channels/calls with the multicall than required to support the INVITE request or not supporting multicall at all, the MGCF deduces whether the IP/IMS leg needs to be renegotiated, i.e. whether the bandwidth needs to be negotiated downwards for some media component (typically the video component, but another media component may also be selected or preselected).
If yes, The MGCF adapts the IMS leg to the final configuration at the CS leg with a re-INVITE request to the IMS.

Thus, as explained in greater detail above, in an IP/IMS originated session, the MGCF/MGW uses the bandwidth requested/agreed in the IP/IMS leg to decide whether a multicall/multilink connection is required towards the called CS party. If the CS party does not support a correspondingly required multicall/multilink service, the MGCF renegotiates the session backwards with the IP/IMS party.

On the other hand, the procedure in an IP/IMS terminated session is as follows:
The CS party starts making calls to start a multimedia session over multicall/multilink.
If there is an indication of multilink operation in the setup signaling, the MGCF may wait for the rest of the CS calls to be set-up and make a SIP INVITE from the aggregate of the bandwidth parameters of each call belonging to the context.
If the MGCF cannot deduce the number of the calls of the context, it may have to send a re-INVITE to the IP/IMS party's terminal to upgrade the session parameters after a new incoming CS call belonging to the same context.
If the IP/IMS party negotiates the bandwidth downwards in the SIP offer/answer negotiation, the MGCF rejects the related CS calls being set up or tears down already set up CS calls, maintaining a number of calls required for supporting the bandwidth agreed for the IP/IMS leg.

Thus, as explained in greater detail above, in an IP/IMS terminated session, the MGCF builds the SIP INVITE according to the aggregation of the multiple incoming CS calls, using a RE-INVITE to update the IP/IMS leg to match the final configuration at the CS leg.

Second Embodiment

The second embodiment of the present invention is also referred to as solution 2 in the following description.

Basically, when described on a general level, according to the second embodiment, the present invention proposes a method for enabling interworking between domains of a communication network operated based on different switching principles. A communication session between a first terminal associated to a first domain and a second terminal associated to a second domain is effected via a first communication path leg from said first terminal to a gateway entity, and from said gateway entity via a second communication path leg to said second terminal. Said second communication path leg has a restricted transmission bandwidth per call of said communication session.

Figure 3:
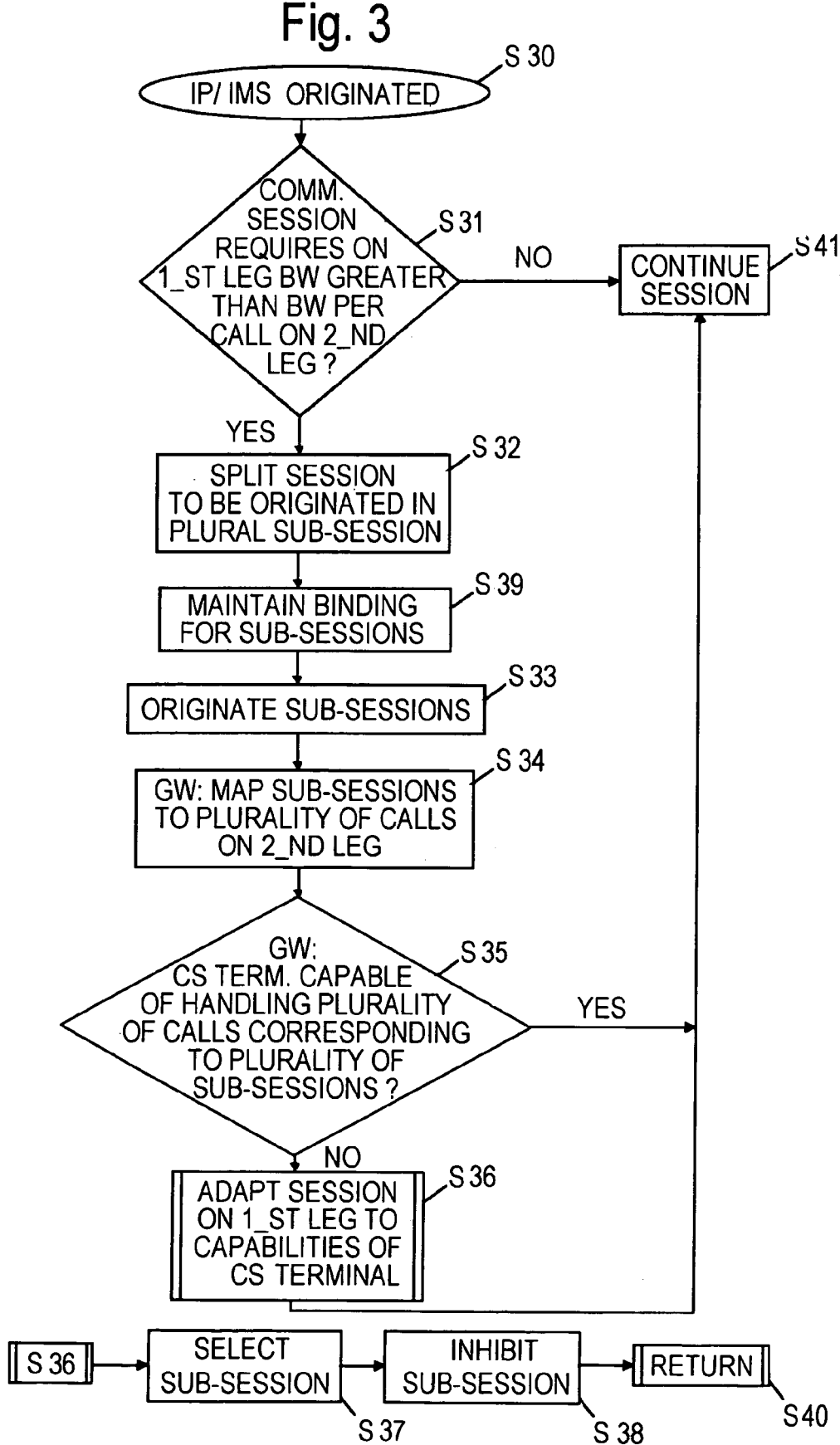
FIG. 3 is a flowchart illustrating the method according to another, i.e. second embodiment of the present invention in case of a packet switched domain originated session.

As shown in FIG. 3, the method comprises the steps of:
evaluating, S31, whether said communication session to be originated requires a transmission bandwidth exceeding said restricted transmission bandwidth per call of said communication session on said second communication path leg, if said required transmission bandwidth exceeds said restricted transmission bandwidth per call, splitting, S32, said communication session to be originated into a plurality of sub-sessions not exceeding said restricted transmission bandwidth, originating, S33, the plurality of said sub-session from said first terminal via said first leg towards said gateway entity, and mapping, S34, said plurality of sub-sessions to a plurality of calls on said second communication path leg.

Also, the method further comprises the steps of determining, S35, at said gateway entity, whether said second terminal is capable of supporting a plurality of calls corresponding to the number of originated sub-sessions, and in case said second terminal is incapable of supporting such a plurality of calls, adapting, S36, the communication session on said first communication path leg to the capabilities of said second terminal.

After adaptation and in case said second terminal has the required capabilities, the session continues normally, S41.

Also, after evaluating that said session does not require an exceeding bandwidth (No in S31), the session continues normally.

Said step of adapting comprises a step of selecting, S37, a sub-session of said communication session, and inhibiting, S38, the selected sub-session on said first communication path leg. After these steps, the flow returns, S40, to the main routine and the session continues normally. Inhibiting means to terminate a corresponding sub-session.

Furthermore, said step of splitting further comprises a step of maintaining, S39, a binding for said sub-sessions indicating that said split sub-sessions constitute said communication session, while said step of evaluating further comprises the steps of judging a response received at said first terminal from said gateway in reaction to a session establishment request.

FIG. 3 illustrates the case in which the establishment of the communication session is originated from the first terminal and terminated at the second terminal.

Figure 4:
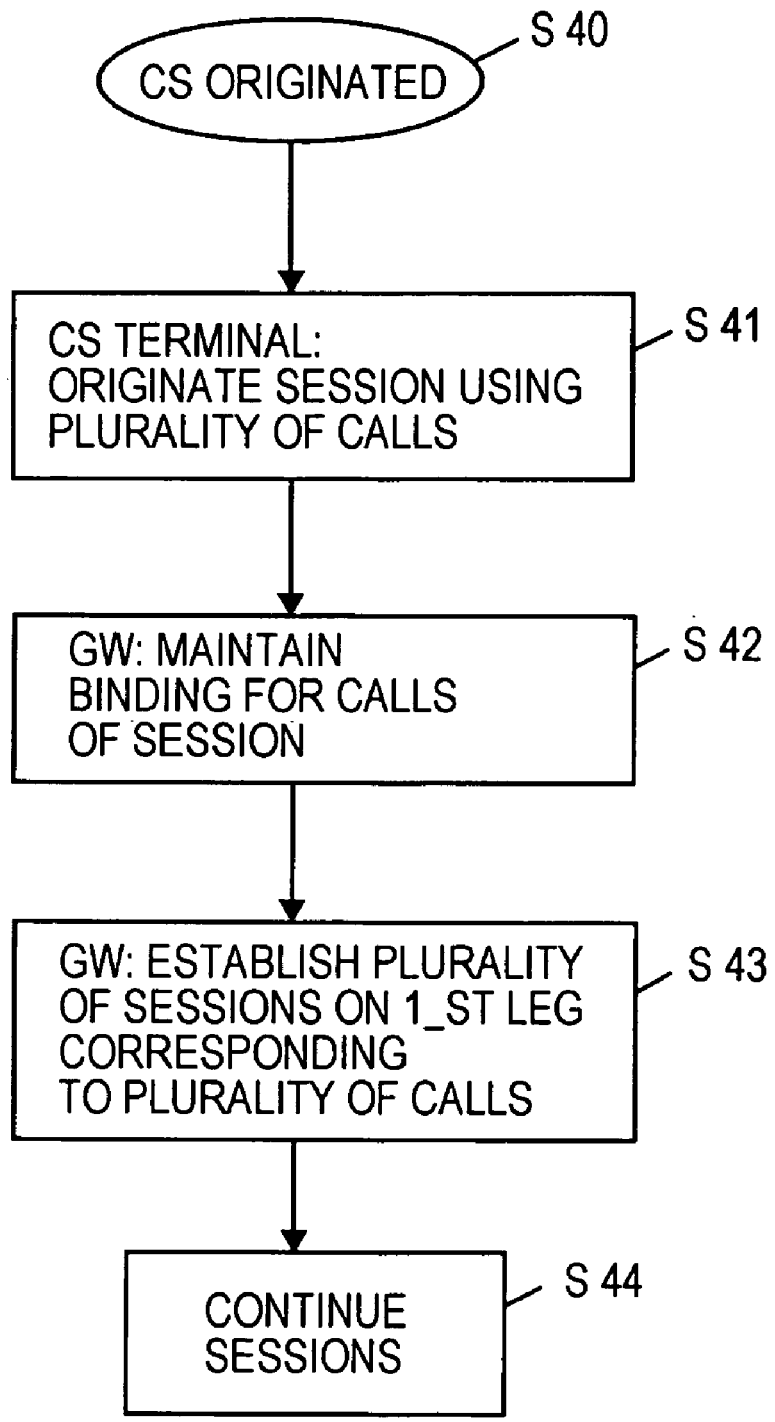
FIG. 4 is a flowchart illustrating the method according to the another, i.e. second embodiment of the present invention in case of a circuit switched domain originated session.

FIG. 4 illustrates the case in which the establishment of the communication session is terminated at the first terminal, i.e. originated from the second terminal.

Basically, when described on a general level, according to the second embodiment under such a scenario, the present invention proposes a method for enabling interworking between domains of a communication network operated based on different switching principles. A communication session between a first terminal associated to a first domain and a second terminal associated to a second domain is effected via a second communication path leg from said second terminal to a gateway entity, and from said gateway entity via a first communication path leg to said first terminal.

As shown in FIG. 4, the method comprises the steps of:

originating, S41, said communication session from said second terminal via said second leg towards said gateway entity using a plurality of calls for said communication session, maintaining, S42, at said gateway entity, a binding for said plurality of calls indicating that said plurality of calls constitute said communication session; and establishing, S43, said plurality of calls to a plurality of sessions on said first communication path leg.

After this, the sessions are continued normally.

Having described the present invention on a general level hereinbefore, the present invention is subsequently described with reference to a practical example. The respective correspondence between the general features of the invention and the practical implementation of these features in the practical example will be readily recognized by the interested reader.

Solution 2: End-to-End Multilink Oriented

The end-to-end multilink oriented solution can be supported with a combination of existing features (binding of media streams, splitting and combining of media flows/components into/from media streams, session reinvitations) and a new feature ("multicall indication") at the IP/IMS terminal, and with a "multicall indication" generation and standard session/call handling measures in the MGCF/MGW or in a video gateway network element.

The procedure in an IP/IMS originated session is as follows:

The IP/IMS terminal, knowing that it is setting up a session with a CS party, requests multiple RTP sessions for a media stream requiring a bandwidth higher than that supported by a single 64 kbit/s channel/call. With SDP/SIP this is done by coding several "m lines" (media lines) in the SDP in the SIP INVITE message.

Alternatively, the IP/IMS terminal may set up several SIP sessions for that purpose. In this case the terminal sends several SIP INVITE messages to the network addressing the same called CS party.

The RTP sessions, or in the alternative way the SIP sessions, of the same media flow/component are bound together with a binding indicator. For example the following binding method standardized in IETF "Grouping of media" (defined for using different codecs for a single media flow to optimise transmission in error prone environments like mobile networks, but applicable without changes for the purposes of this invention, too) can be used, but other binding methods are also possible:

Each media line belonging to the same context, i.e. media flow/component, has a "media stream identification" and a "group" attribute in the media line of the SDP.

The MGCF/MGW use the indicators to determine, which RTP sessions, or in the alternative way the SIP sessions, belong to the same media flow/component. The streams themselves are then identified by IP addresses and port numbers on the user plane.

The MGCF/MGW maps the RTP sessions, or in the alternative solution the separate SIP sessions, belonging to the same media flow/component to separate CS calls towards the called CS party.

Depending on the level of support of the multicall feature by the CS party, i.e. supporting fewer channels with the multicall than required to support the RTP sessions, or in the alternative way the SIP sessions, the MGCF terminates the related RTP session(s) (with a re-INVITE) or SIP sessions (with BYE or a relevant message).

Further, if the IP/IMS terminal does not know that it is calling a CS terminal, it most probably just requests single RTP sessions for each media component. This is even probable in practice, because the calling party cannot know for example if the call is forwarded to a CS terminal. In this case:

The MGCF sends a rejection with a "multicall" indication to the IP/IMS terminal, which triggers the terminal to send a re-INVITE (or in the alternative way several re-INVITEs) to replace the high bandwidth RTP session in the originally requested SIP session with the required lower bandwidth RTP (or SIP) sessions.

The "multicall" indication can be for example a standard (existing) SIP response like one of the 4xx (Request Failure) responses or a new 4xx response defined for this purpose.

Later, depending on the level of support of the multicall feature by the CS party, i.e. supporting fewer channels with the multicall than required to support the RTP sessions, or in the alternative way the SIP sessions, the MGCF terminates the related RTP session(s) (with a re-INVITE) or SIP sessions (with BYE or a relevant message).

Thus, as explained in greater detail above, in an IP/IMS originated session the IP/IMS terminal, knowing that it is setting up a session with a CS party, requests multiple RTP sessions for a media stream requiring a bandwidth higher than that supported by a single 64 kbit/s channel/call. Alternatively, the IP/IMS terminal may set up several SIP sessions for that purpose. The MGCF/MGW map the RTP sessions, or in the alternative solution the separate SIP sessions, to CS calls within a multicall/multilink operation towards the CS party. Further, if the IP/IMS terminal does not know that it is calling a CS terminal, it most probably just requests single RTP sessions for each media component. In this case the MGCF sends a rejection with a "multicall" indication to the IP/IMS terminal, which triggers the terminal to send a re-INVITE (or several re-INVITEs) to replace the high bandwidth SIP session with the required lower bandwidth RTP (or SIP) sessions.

The procedure in an IP/IMS terminated session is as follows:

The CS party starts making calls to start a multimedia session over multicall/multilink.

The MGCF/MGW, in order to establish plural sessions, either requests several separate RTP sessions in a SIP session with a single INVITE in order to support the media flow/component requiring the use of the multicall/multilink in the CS leg, or alternatively maps the CS calls separately towards the IP/IMS network, i.e. establishes separate SIP sessions by sending a separate SIP INVITE for each CS call.

The MGCF/MGW uses the binding mechanism described in conjunction with the IP/IMS originated call to bind the RTP session (or SIP session in the alternative way) related to the same incoming multicall/multilink operation and consequently to the same media flow/component.

Thus, as explained in greater detail above, in an IP/IMS terminated session, the MGCF/MGW either requests several separate RTP sessions in a SIP session with a single INVITE in order to support the media component requiring the use of the multicall/multilink in the CS leg, or alternatively maps the CS calls separately towards the IP/IMS network, i.e. establishes separate SIP sessions by sending a separate SIP INVITE for each CS call.

Notwithstanding the above focus on a method aspect of the present invention, it is to be understood that the present invention also concerns a gateway entity configured to enable interworking between domains of a communication network operated based on different switching principles, and operating according to the methods as described herein.

In brief, such gateway entities are illustrated as respective block circuit diagrams in FIGS. 6A, 6B and 7A, 7B.

Figure 6A:
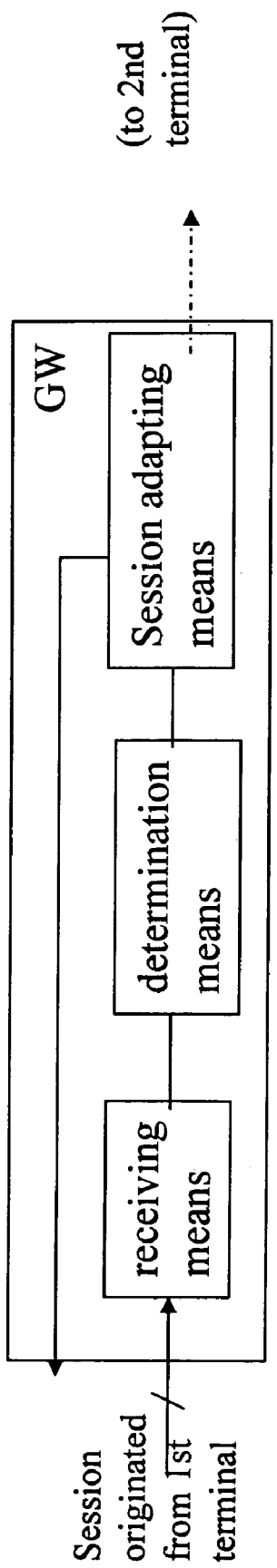
FIGS. 6A, 6B and 7A, 7B show block circuit diagrams of gateway entities according to the present invention.

Namely, as shown in FIG. 6A, a gateway entity to enable interworking between domains of a communication network operated based on different switching principles comprises receiving means for receiving a communication session originated from a first terminal via a first communication path leg towards the gateway entity. It further comprises determining means, connected to said receiving means, for determining, at said gateway entity, whether a second terminal is capable of supporting a number of calls required for handling the received originated communication session. Still further, it comprises adapting means, connected to and responsive to said determining means, for adapting the communication session on the first communication path leg to capabilities of said second terminal if said second terminal is incapable of supporting the number of calls. (The adapting functionality is shown by the arrow going back from the adapting means towards the session received from the first terminal.)

Figure 6B:
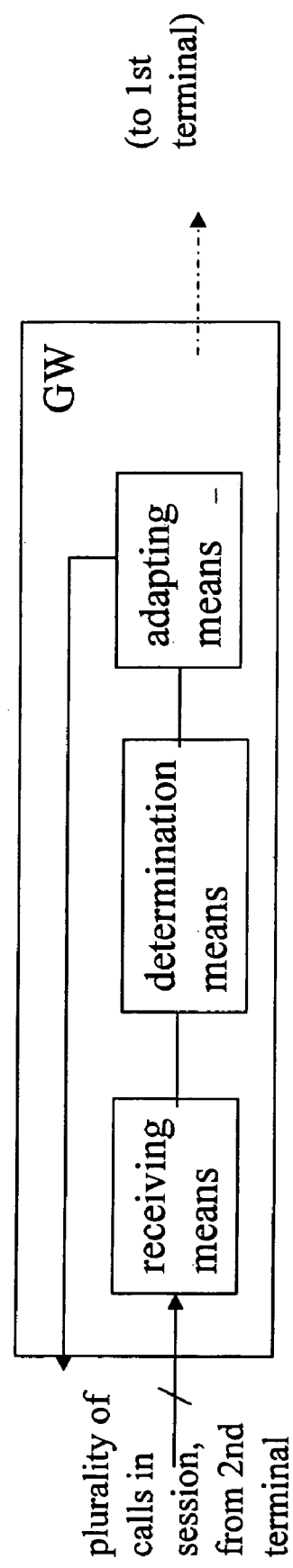

Furthermore, under another one of the above described scenarios, a gateway entity to enable interworking between domains of a communication network operated based on different switching principles comprises, as shown in FIG. 6B, receiving means for receiving a communication session originated from a second terminal via a second communication path leg towards a gateway entity using a plurality of calls for said communication session. Such a gateway further includes, connected to said receiving means, determining means for determining, at said gateway entity, whether a first terminal is capable of supporting the plurality of calls constituting the received originated communication session; and comprises further, connected to and responsive to said determining means, adapting means for adapting the communication session on the second communication path leg to capabilities of said first terminal if said first terminal is incapable of supporting the plurality of calls. (The adapting functionality is shown by the arrow going back from the adapting means towards the session received from the second terminal.)

Figure 7A:
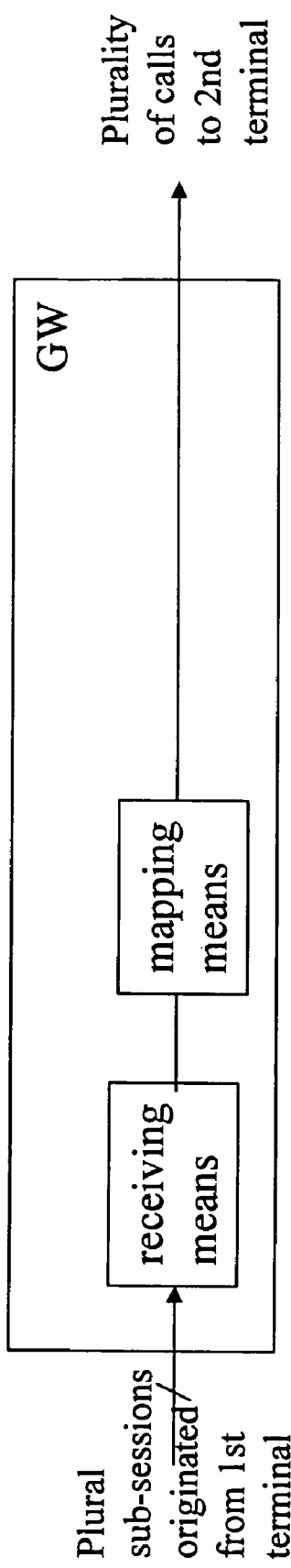
Figure 7B:
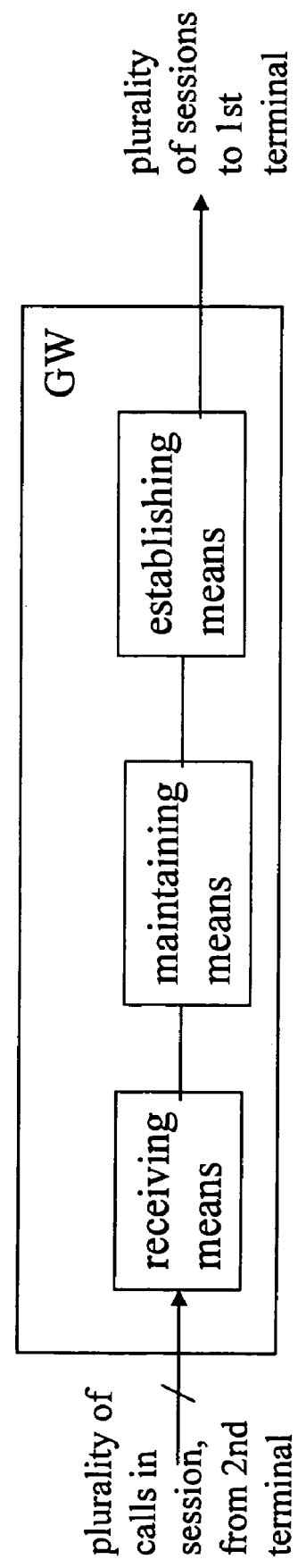

Under a still further aspect described above, there is provided another gateway entity to enable interworking between domains of a communication network operated based on different switching principles. Such a gateway entity, as shown in FIG. 7A, comprises receiving means for receiving a plurality of said sub-sessions originated from a first terminal via a first communication path leg towards the gateway entity; and comprises mapping means connected thereto for mapping said plurality of sub-sessions to a plurality of calls on said second communication path leg.

Finally, with regard to another aspect described above, as shown in FIG. 7B, a gateway entity to enable interworking between domains of a communication network operated based on different switching principles, comprises receiving means for receiving a communication session originated from a second terminal via a second communication path leg towards the gateway entity using a plurality of calls for said communication session; and, connected thereto, maintaining means for maintaining, at said gateway entity, a binding for said plurality of calls indicating that said plurality of calls constitute said communication session; and connected to said maintaining means, establishing means for establishing said plurality of calls to a plurality of sessions on said first communication path leg.

Accordingly, as has become apparent from the foregoing, the present invention addresses multimedia calls at a data rate higher than 64 kbit/s (e.g. 128 kbit/s) which use the multicall supplementary service in circuit switched 3GPP mobile networks and a multilink operation in ISDN, i.e. separate calls for each max. 64 kbit/s portion of the total session, i.e. the calling entity establishes several calls to the same B party. The sending entity (at each end) splits the data into the separate simultaneous channels/calls whereas the receiving entity combines the data received from the separate simultaneous calls (multicall, multilink). IP based multimedia typically uses one RTP session for each media component, i.e. one RTP session for audio, one for video, one for data, etc., no matter what the bandwidth requirement for each media component is. The problem is, how the IP/CS interworking can be arranged, if the CS leg uses a multicall/multilink operation. The proposed solution according to the present invention is two-fold, either 1) the MGCF+MGW performs aggregation and separation of multicall, or 2) several media streams/SIP calls should be used. This enables interworking with the multicall/multilink between IMS and CS networks at data rates higher than 64 kbit/s.

APPENDIX

List of Abbreviations

| | |
|---|---|
| CS | Circuit switched |
| HTTP | Hyper text transport protocol |
| IMS | IP multimedia system/services |
| IP | Internet protocol |
| ISDN | Integrated services digital network |
| MCU | Multipoint control unit |
| MGCF | Media gateway control function |
| MGW | Media gateway |
| RTP | Real time protocol |
| RTSP | Real time streaming protocol |
| SDP | Session description protocol |
| SIP | Session initiation protocol |
| SMIL | Synchronized multimedia integration language |
| UDP | User datagram protocol |
| UMTS | Universal mobile telecommunication system |
| UTRAN | UMTS terrestrial radio access network |

The invention claimed is:

1. A method comprising:

receiving, at a gateway entity, a communication session originated at a first terminal associated to a first domain via a first communication path leg at the gateway entity;

determining, at said gateway entity, whether a second terminal associated to a second domain having different switching from the first domain is capable of supporting a number of calls required for handling the originated communication session via a second communication path leg from said gateway entity, said second communication path leg having a restricted transmission bandwidth per call of said communication session; and adapting, at the gateway entity, the communication session on the first communication path leg to capabilities of said second terminal, when said second terminal is incapable of supporting the number of calls, wherein the communication session is an internet protocol multimedia session, and wherein the adapting further comprises selecting a media component of the communication session to enable renegotiation of a bandwidth for the selected media component.

2. A method according to claim 1, wherein the gateway entity is coupled between the first domain and the second domain, and wherein the first domain comprises packet switching and the second domain comprises circuit switching.

3. A method comprising:

receiving, at a gateway entity, a communication session originated at a second terminal associated to a second domain via a second communication path leg at the gateway entity using a plurality of calls for said communication session, wherein the second domain comprises circuit switching;

determining, at said gateway entity, whether a first terminal associated to a first domain having different switching from the second domain is capable of supporting the plurality of calls constituting the originated communication session, wherein the first domain comprises packet switching; and adapting, at the gateway entity, the communication session on the second communication path leg to capabilities of said first terminal when a first terminal is incapable of supporting the plurality of calls, wherein adapting comprises selecting a call from the plurality of calls from the second domain comprising circuit switching and inhibiting the call, such that any remaining calls are adapted to the capabilities of first terminal, wherein the communication session is an internet protocol multimedia session, and wherein the adapting further comprises selecting a media component of the communication session to enable renegotiation of a bandwidth for the selected media component.

4. An apparatus comprising:

a receiver configured to receive a communication session originated from a first terminal associated to a first domain via a first communication path leg towards a gateway entity;

a processor configured to determine whether a second terminal associated to a second domain different from the first domain in switching principle, is capable of supporting a number of calls required for handling the received originated communication session and adapt the communication session on the first communication path leg to capabilities of said second terminal when said second terminal is incapable of supporting the number of calls, wherein the communication session is a multimedia session, and wherein the adapting further comprises selecting a media component of the communication session to enable renegotiation of a bandwidth for the selected media component.

5. An apparatus, comprising:

a receiver configured to receive a communication session originated from a second terminal associated to a second domain via a second communication path leg towards a gateway entity using a plurality of calls for said communication session; and a processor configured to determine whether a first terminal associated to a first domain different from the second domain in switching principle is capable of supporting the plurality of calls constituting the received originated communication session, the processor further configured to adapt the communication session on the second communication path leg to capabilities of said first terminal when said first terminal is incapable of supporting the plurality of calls, wherein the communication session is a multimedia session, and wherein the adapting further comprises selecting a media component of the communication session to enable renegotiation of a bandwidth for the selected media component.

* * * * *